(12) United States Patent
Jaskiewicz et al.

(10) Patent No.: US 10,760,704 B2
(45) Date of Patent: Sep. 1, 2020

(54) SERVOVALVE ASSEMBLY

(71) Applicant: Hamilton Sundstrand Corporation, Charlotte, NC (US)

(72) Inventors: Zbigniew Jaskiewicz, Wroclaw (PL); Sebastian Szymański, Wroclaw (PL)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/157,144

(22) Filed: Oct. 11, 2018

(65) Prior Publication Data
US 2019/0234525 A1 Aug. 1, 2019

(30) Foreign Application Priority Data
Jan. 31, 2018 (EP) ..................................... 18461512

(51) Int. Cl.
*F16K 31/06* (2006.01)
*F15B 9/06* (2006.01)
*F15B 13/043* (2006.01)

(52) U.S. Cl.
CPC ............ *F16K 31/0682* (2013.01); *F15B 9/06* (2013.01); *F15B 13/0436* (2013.01)

(58) Field of Classification Search
CPC ..... F16K 31/0682; F15B 13/0436; F15B 9/06
See application file for complete search history.

(56) References Cited

U.S. PATENT DOCUMENTS 2,996,072 A  8/1961  Atchley
3,217,728 A  11/1965  Pegram
3,386,343 A  6/1968  Gary
3,584,649 A * 6/1971  Cobb ................... F15B 13/0436
                                                    137/625.61
3,908,471 A  9/1975  O'Connor et al.
4,046,061 A  9/1977  Stokes
(Continued)

FOREIGN PATENT DOCUMENTS

EP   3023647 A1   5/2016
FR   1340201 A    10/1963
GB   2104249 A    3/1983

OTHER PUBLICATIONS

Extended European Search Report for International Application No. 18461512.8 dated Aug. 20, 2018, 8 pages.

*Primary Examiner* — Jessica Cahill
*Assistant Examiner* — Patrick C Williams
(74) *Attorney, Agent, or Firm* — Cantor Colburn LLP

(57) ABSTRACT

A servovalve includes a fluid transfer valve assembly comprising a supply port and a control port; a moveable valve spool arranged to regulate flow of fluid from the supply port to the control port in response to a control signal; and a drive assembly configured to axially move the valve spool relative to the fluid transfer assembly in response to the control signal to regulate the fluid flow. The drive assembly comprises a steerable jet pipe moveable by an amount determined by the control signal to cause corresponding movement of the valve spool. The jet pipe terminates at one end in a nozzle and at the other end being in fluid flow engagement with and fixedly connected to a fluid supply torsion tube arranged to receive fluid from a fluid source. Movement of the valve spool is caused by fluid flowing from the nozzle to engage with the valve spool.

10 Claims, 4 Drawing Sheets

(56) References Cited

U.S. PATENT DOCUMENTS

| | | | |
|---|---|---|---|
| 5,156,189 A * | 10/1992 | Tranovich | F15B 13/043 |
| | | | 137/625.63 |
| 6,786,238 B2 | 9/2004 | Frisch | |
| 7,290,565 B2 * | 11/2007 | Achmad | C09B 67/0015 |
| | | | 137/625.61 |
| 9,309,900 B2 | 4/2016 | Kopp | |
| 9,677,682 B2 | 6/2017 | Bertrand | |
| 9,897,116 B2 * | 2/2018 | Ozzello | F15B 13/0436 |
| 2008/0110513 A1 * | 5/2008 | Druhan | F15B 13/0436 |
| | | | 137/625.63 |
| 2015/0047729 A1 | 2/2015 | Kopp et al. | |
| 2016/0348805 A1 | 12/2016 | Michel | |

* cited by examiner

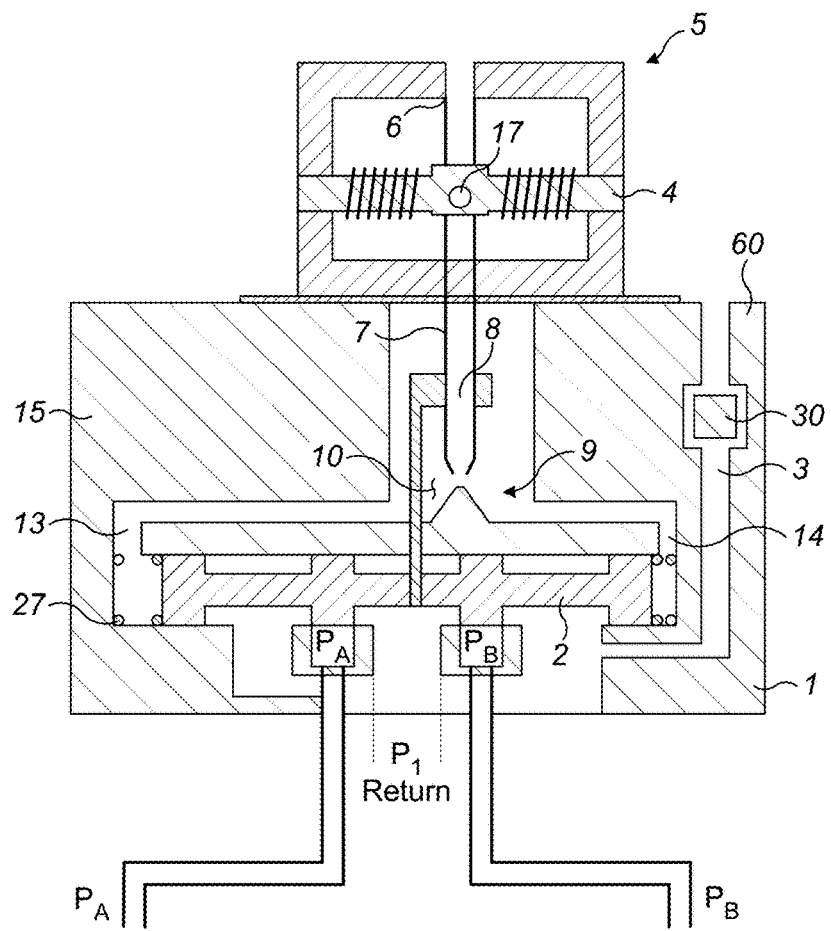
FIG. 1 *(PRIOR ART)*
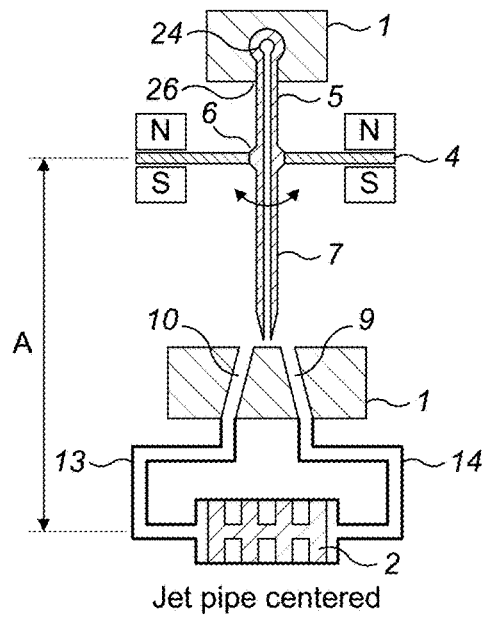
FIG. 2 *(PRIOR ART)*

SERVOVALVE ASSEMBLY

This application claims priority to European Patent Application No. 18461512.8 filed Jan. 31, 2018, the entire contents of which is incorporated herein by reference.

TECHNICAL FIELD

The present disclosure relates to servovalves used to transfer quantities of, or manage the flow of fluid e.g. air.

BACKGROUND

Servovalves find a wide range of applications for controlling air or other fluid flow to effect driving or control of another part e.g. an actuator.

A servovalve assembly includes a motor controlled by a control current which controls flow to an air valve to control an actuator. Generally, a servovalve transforms an input control signal into movement of an actuator cylinder. The actuator controls e.g. an air valve. In other words, a servovalve acts as a controller, which commands the actuator, which changes the position of e.g. an air valve's flow modulating feature.

Such mechanisms are used, for example, in various parts of aircraft where the management of air/fluid flow is required, such as in engine bleeding systems, anti-ice systems, air conditioning systems and cabin pressure systems. Servovalves are widely used to control the flow and pressure of pneumatic and hydraulic fluids to an actuator, and in applications where accurate position or flow rate control is required.

Conventionally, servovalve systems operate by obtaining pressurised fluid from a high pressure source which is transmitted through a load from which the fluid is output as a control fluid. Various types of servovalves are known—see e.g. GB 2104249, US 2015/0047729 and U.S. Pat. No. 9,309,900.

Electrohydraulic servovalves can have a first stage with a motor, e.g. an electrical or electromagnetic force motor or torque motor, controlling flow of a hydraulic fluid to drive a valve member e.g. a spool valve of a second stage, which, in turn, can control flow of hydraulic fluid to an actuator for driving a load. The motor can operate to position a moveable member, such as a flapper, in response to an input drive signal or control current, to drive the second stage valve member e.g. a spool valve.

Particularly in aircraft applications, but also in other applications, servovalves are often required to operate at various pressures and temperatures. For e.g. fast acting air valve actuators, relatively large flows are required depending on the size of the actuator and the valve slew rate. For such high flow rates, however, large valve orifice areas are required. For 'flapper' type servovalves, problems arise when dealing with large flows due to the fact that flow force acts in the direction of the flapper movement and the motor is forced to overcome the flow forces. For clevis-like metering valves such as described in U.S. Pat. Nos. 4,046,061 and 6,786,238, the flow forces, proportional to the flow, act simultaneously in opposite directions so that the clevis is balanced and centered. The clevis, however, needs to be big due to the requirement for bigger orifices to handle larger flows.

Jet pipe servovalves provide an alternative to 'flapper'-type servovalves. Jet pipe servovalves are usually larger than flapper type servovalves but are less sensitive to contamination. In jet pipe systems, fluid is provided via a jet pipe to a nozzle which directs a stream of fluid at a receiver. When the nozzle is centered—i.e. no current from the motor causes it to turn, the receiver is hit by the stream of fluid from the nozzle at the centre so that the fluid is directed to both ends of the spool equally. If the motor causes the nozzle to turn, the stream of fluid from the nozzle impinges more on one side of the receiver and thus on one side of the spool more than the other causing the spool to shift. The spool shifts until the spring force of a feedback spring produces a torque equal to the motor torque. At this point, the nozzle is centred again, pressure is equal on both sides of the receiver and the spool is held in the centered position. A change in motor current moves the spool to a new position corresponding to the applied current.

As mentioned above, jet pipe servovalves are advantageous in that they are less sensitive to contamination e.g. in the supply fluid or from the valve environment. These valves are, however, more complex and bulkier. Conventionally, the jet pipe is mounted to a torsion tube that extends external to the valve body and is fixed e.g. by welding or soldering to the valve body. Fluid, e.g. oil, is supplied to the jet pipe via the torsion tube. Because the torsion tube is fixedly mounted to the valve body, it needs to bend as the position of the nozzle, and hence the jet pipe, changes. The torque motor for controlling the jet pipe nozzle position also needs, therefore, to be powerful enough to bend the metal torsion tube. This bending takes about 80% of the torque motor's power. If, therefore, the jet pipe valve is to be used in high pressure applications as an alternative to a flapper valve (e.g. in the range of 31.5 MPa or more), and is to maintain accuracy, the torsion tube will need to be sufficiently strong (i.e. have stronger/thicker walls) which means a very powerful torque motor needs to be used. The torque motor that comprises electromagnets to apply electromagnetic force to an armature to move the jet pipe is large and heavy, which adds to the size, weight and complexity of the overall system.

There is a need for a jet-pipe servovalve arrangement that is able to operate accurately and reliably, particularly at higher pressures, using a smaller torque motor.

The present disclosure provides a servovalve comprising: a fluid transfer valve assembly comprising a supply port and a control port; a moveable valve spool arranged to regulate flow of fluid from the supply port to the control port in response to a control signal; and a drive assembly configured to axially move the valve spool relative to the fluid transfer assembly in response to the control signal to regulate the fluid flow; wherein the drive assembly comprises a steerable jet pipe moveable by an amount determined by the control signal to cause corresponding movement of the valve spool; the jet pipe terminating at one end in a nozzle and at the other end being in fluid flow engagement with and fixedly connected to a fluid supply torsion tube arranged to receive fluid from a fluid source, whereby movement of the valve spool is caused by fluid flowing from the nozzle to engage with the valve spool, and wherein the end of the torsion tube furthest from the jet pipe is fixedly attached to a slider component having a port in fluid flow engagement with the fluid source, in use; the slider component mounted for sliding movement responsive to movement of the jet pipe responsive to the control signal, and the slider component providing a fluid flow channel between the port and the torsion tube and hence to the jet pipe.

The slider component preferably comprises an annular ring having a port to a hole therethrough which receives fluid, e.g. oil. from the fluid source and transfers it to the torsion tube and hence to the jet pipe and the nozzle. The slider component is mounted into the valve body in a space providing sufficient room for the slider component to move from side to side. The torsion tube is fixedly attached to the slider component and is fixed, e.g. by welding or soldering, where it connects to the jet pipe, to the valve armature.

The slider ring is preferably provided with annular seals to allow for reciprocating side to side movement. In the preferred operation, the slider ring is fixed to the torsion tube in a first orientation or plane, e.g. such that the torsion tube extends radially relative to the ring, and the hole in the ring defines a channel that is in a different orientation or plane, preferably substantially perpendicular to the torsion tube or through the centre axis of the ring. The fluid/oil then flows axially relative to the ring from the fluid source through the channel and then radially through the body of the ring and through the torsion tube.

In a preferred arrangement, the slider component comprises two co-axial seals mounted in annular seal seats, the hole/channel being defined along the common axis.

The fluid transfer valve assembly may also comprise a return port for pressure returning through the assembly.

In a jet-pipe system, supply fluid is provided from a fluid (e.g. oil) source via the supply pipe, into the jet pipe and out through the nozzle, where it is directed into the valve assembly via a receiver. The receiver is preferably configured such that when the nozzle is in a central position, fluid enters the valve assembly evenly via both sides of the receiver, e.g. by opposing lateral receiver channels. When the nozzle is steered to an off-centre position, more fluid flows to one side of the valve assembly than the other via the receiver; e.g. more flows through one lateral receiver channel than the other.

Preferred embodiments will now be described with reference to the drawings.

BRIEF DESCRIPTION OF THE DRAWINGS

FIG. 1 is a sectional view of a conventional jet pipe servovalve.

FIG. 2 is a simplified schematic view of a conventional servovalve.

DETAILED DESCRIPTION

Figure 3C:
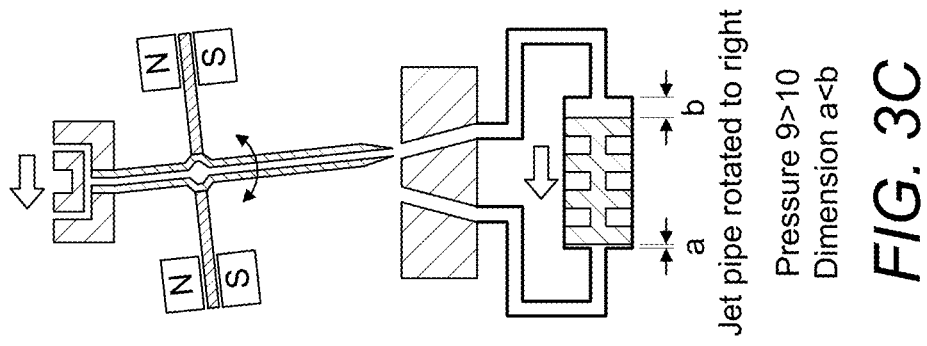
FIGS. 3A to 3C show, schematically, operation of a jet-pipe assembly according to this disclosure.

A servovalve as described below can, for example, be used in an actuator control system. The servovalve is controlled by a torque motor to control a control flow of fluid that is output to control the movement of an actuator.

With reference to FIGS. 1 and 2, a conventional jet pipe servovalve will first be described. The arrangement comprises a servovalve assembly have a torque motor and drive assembly having a motor armature 4 and a moveable spool 2 mounted in a supporting block 15 arranged within an assembly housing 1. The spool 2 is part of a spool assembly having: supply ports, control ports, and a return port. Flow is possible between the ports via a passage through the spool 2. The torque motor provides current that moves an armature 4 that causes a jet pipe 7 to turn at its end closest to the spool, which end terminates in a nozzle. Supply fluid is provided from the supply port, via a torsion tube or supply pipe 5, which may include a filter 30, to the top of the jet pipe—i.e. the end opposite the end with the nozzle, and the supply fluid flows through the jet pipe and out of the nozzle. The supply pipe 5, also known as a feed tube or a torsion tube, is fixed to the housing where the pipe enters the housing. The other end of the supply pipe is fixed to the jet pipe and/or the armature e.g. by soldering or welding 6. A receiver 9, 10 is provided in the block below the nozzle. The receiver provides two channels 13, 14 via which fluid from the nozzle flows into the spool 2. When no current is applied by the motor to the jet pipe, the nozzle is centered relative to the receiver 9, 10 and supply fluid exiting the nozzle flows equally through both channels 13, 14 and thus equally to both ends of the spool 2. The spool therefore remains centered—i.e. 'closed' so that no fluid flows through the control ports. When actuator control is desired, the motor provides a control current to the jet pipe via the armature 4 causing the nozzle to turn away from the centered position. The jet pipe and nozzle are turned due to an electromagnetic force created by electromagnets of the torque motor acting on the armature which acts on the jet pipe. The supply fluid through the nozzle then flows predominantly through one receiver channel 13 or 14 as compared to the other channel. More fluid flows, therefore, into the corresponding end of the spool 2 causing axial movement of the spool 2 with either blocks/occludes the passage between the supply port and the respective control port or opens the passage to allow flow between the two ports, depending on the axial position of the spool due to the position of the nozzle, thus modulating pressure on the control ports and controlling the actuator (not shown).

In an example, the assembly is arranged to control an actuator based on the fluid flow from the control port. The servovalve controls an actuator which, in turn, controls an air valve.

Supply pressure is provided to the spool 2 via spool supply ports. The pressure at return port is atmospheric pressure which will vary depending e.g. on the altitude of the aircraft in flight. Control ports provide a controlled pressure, dependant on the nozzle position and resulting spool position, to be provided to an actuator. The torsion tube 5 is also connected to the supply port and routes supply fluid external to the spool 2, preferably via a filter 30, and into the top end of the jet pipe 7. The supply fluid 8 flows down the jet pipe 7 to the nozzle and exits to the receiver described above. The jet pipe 7 is preferably mounted in a flexural tube (not shown). While the nozzle is centered as shown in FIG. 2, equal amounts of fluid go to the two ends of the spool 2.

The spool 2 is in the form of a tubular member arranged in the block 15 to be moved axially by fluid from the jet pipe 7 via the nozzle that is directed at the spool 2 via the receiver.

A feedback spring 27 serves to return the nozzle to the centered position.

In more detail, in the embodiment shown, to open the servovalve, control current is provided to coils of the motor (here a torque motor) creating electromagnetic torque opposing the sum of mechanical and magnetic torque already 'present' in the torque motor. The bigger the electromagnetic force from the coils, the more the jet pipe nozzle turns. The more it turns, the greater the linear or axial movement of the spool 2. A torque motor usually consists of coil windings, a ferromagnetic armature, permanent magnets and a mechanical spring (here two torsional bridge shafts). This arrangement provides movement of the nozzle proportional to the input control current. Other types of motor could be envisaged.

As mentioned above, the torsion tube 5 is fixed, e.g. by a weld 6, relative to the steerable jet pipe 7 and the other end passes into the housing 1 for connection to the supply port. In the conventional design, the torsion tube 5 is fixed to the housing 1 at the point of entry 60 also e.g. by welding or soldering.

The motor, responsive to the control signal, actuates the armature 4 to move the jet pipe 7 in one or other direction (in the drawings, left or right) to cause displacement of the nozzle relative to the receiver, as described above. The rigid connection with the torsion tube 5 causes resulting bending of that pipe because the supply pipe is also fixed to the housing 1. Bending the supply pipe, which is usually made of metal, absorbs a large amount of the motor's power, meaning that larger motors are required.

In the system of the present disclosure, the torsion tube 5 is not fixed to the housing 1. Instead, the torsion tube 5 passes freely through an opening in the housing 1 and is attached to a slider component 16 slidingly arranged within the housing 1. The slider component 16 is shown in more detail in, and will be further described with reference to, FIGS. 4B to 6.

This enables the jet pipe to be moved or steered without bending the torsion tube, as corresponding movement of the supply pipe is permitted by virtue of the sliding movement of the slider component 16 to which it is attached. The torque motor is therefore able to operate at lower power.

Figure 4A:
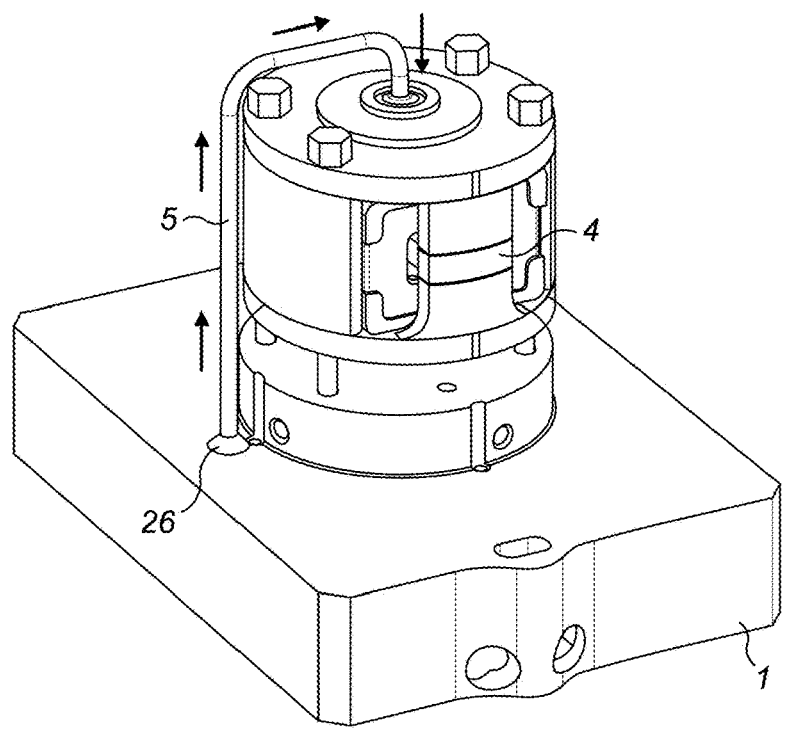
FIG. 4A is a perspective, partially removed, view of a conventional jet pipe assembly.
Figure 4B:
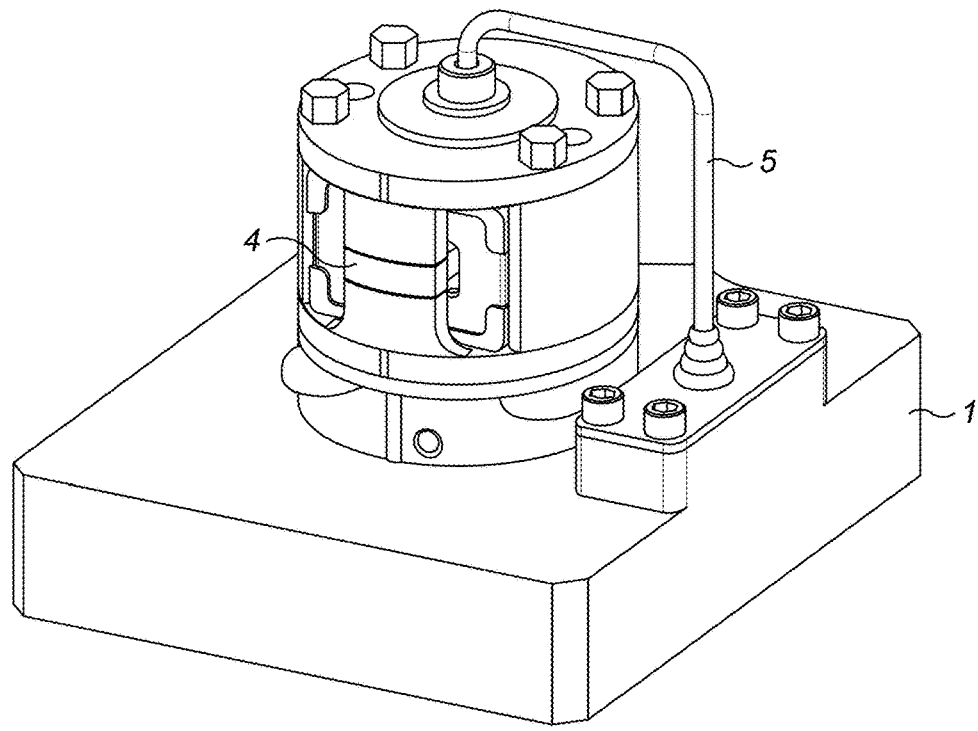
FIG. 4B is a perspective, partially removed, view of a jet pipe assembly according to this disclosure.

FIGS. 4A and 4B contrast the torsion tube 5 configuration of known assemblies with that of the present disclosure. FIG. 4A shows the known manner of fixing the torsion tube 5 to the housing e.g. by solder 26. In contrast, as seen in FIG. 4B, in the present disclosure, the torsion tube passes freely through the housing 1 and is attached to the slider component 16 within the housing 1.

Figure 5:
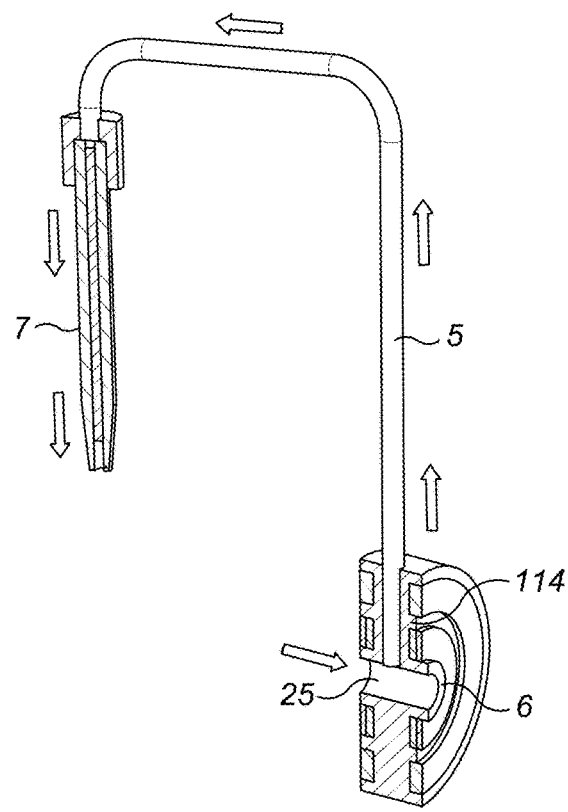
FIG. 5 shows the jet pipe, torsion tube and slider components of an assembly according to this disclosure.
Figure 6:
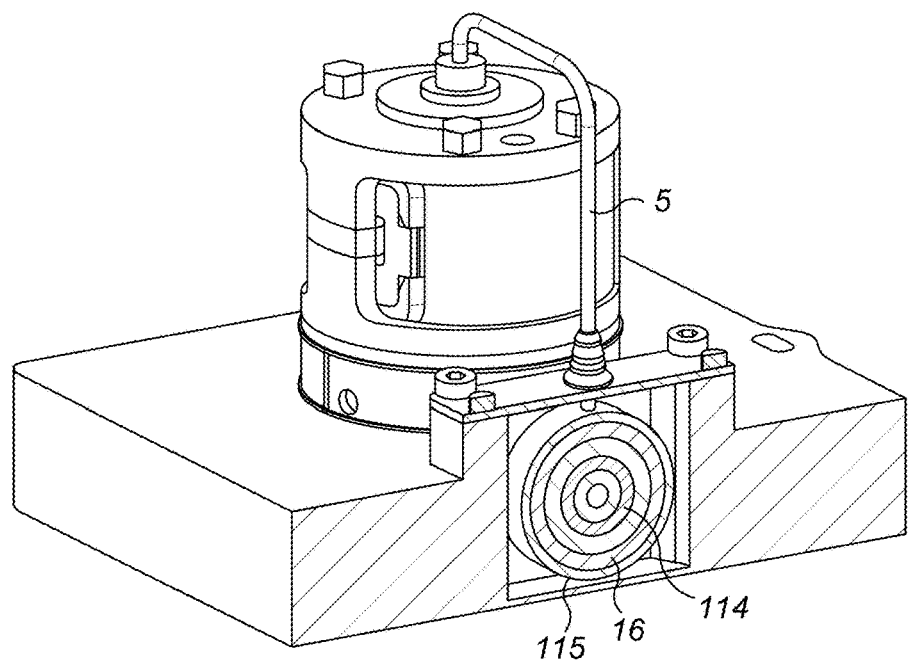
FIG. 6 shows the components of FIG. 5 mounted in an assembly such as shown in FIG. 4.

As best seen in FIGS. 5 and 6, the slider component 16 moves from left to right (in the figure) within a recess with movement of the jet pipe 7. The slider component 16 is provided with a port 25 via which fluid e.g. oil, from the supply channel (not shown) of the valve assembly, enters the torsion tube 5 for conveyance to the spool 2 via the jet pipe 7 and nozzle as described above. The slider component 16 is preferably in the form of a ring in the centre of which is the hole or port 25. Around the hole are mounted seals mounted in seal seats 14,15. The arrows show the direction of flow of the oil coming from the fluid source (not shown) into the channel defined by the hole or port 25 and then through the torsion tube 5 into the jet pipe 7.

Figure 3B:
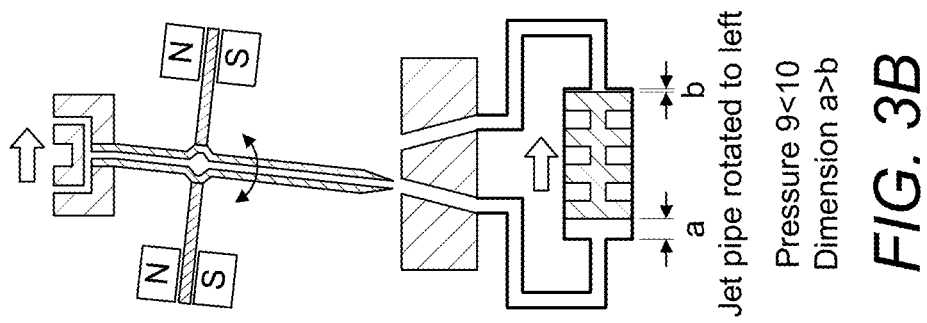
Figure 3A:
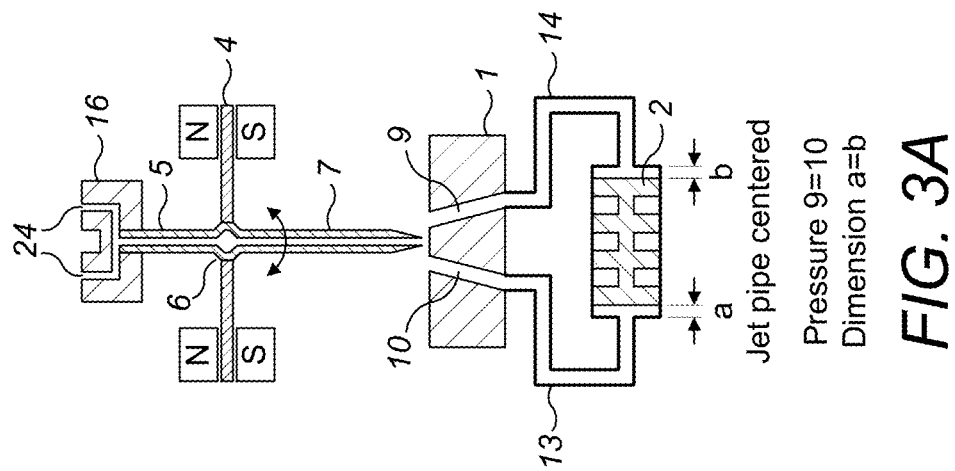

Operation of the assembly is now briefly described with reference to the Figs. FIG. 2 and FIG. 3A show the jet pipe 7 in a centered (non-steered) position. Equal fluid pressure is provided to each end of the spool 2. The slider component 16 thus also remains in the centered position. In response to a control signal, the torque motor may cause deflection of the jet pipe 7 to the left (FIG. 3B), directing more fluid to the left side of the spool 2 via the left channel 10, to push the spool 2 more to the right. Movement of the jet pipe causes corresponding movement of the supply pipe and, hence, the slider component. Alternatively, the control signal may be such as to command the torque motor to cause the jet pipe to move to the right (FIG. 3C), which causes the spool 2 to move to the left and also causes the slider to move to the left.

The tilt armature 4 causes deflection (here left-right) of the torsion tube 5 and, as a result, travel of the ring slider 16 (again left-right), oil flowing through the ring slider 16 all the time. The force acting on the armature 4 is, in effect, a reaction force from the fluid exiting the nozzle into the spool 2 and the force of the slider component 16 caused by the friction of the seals 114,115. This results in a greatly reduced loading on the torque motor.

Operation of the spool and feedback is otherwise as in conventional systems.

The system of this disclosure avoids bending of the supply pipe when the jet pipe is steered, meaning that a relatively smaller torque motor can be used, which results in reduced size and weight of the assembly as well as more accurate and higher rate control of the valve. It is estimated that the power absorbed from the torque motor for the movement of the torsion tube is less than around 10% compared to the absorbed power of around 80% where the torsion tube has to bend.

The arrangement of this disclosure means that jet pipe servovalves can be used in similar pressure ranges to flapper valves. The supply of oil through the moving slider component means that the operating parameters of the valve can be increased to a much higher level.

Although this disclosure has been described in terms of preferred examples, it should be understood that these examples are illustrative only and modifications and alterations are possible within the scope of the claims.

The invention claimed is:

1. A servovalve comprising: a fluid transfer valve assembly comprising a supply port and a control port; a moveable valve spool arranged to regulate flow of fluid from the supply port to the control port in response to a control signal; and a drive assembly configured to axially move the valve spool relative to the fluid transfer assembly in response to the control signal to regulate the fluid flow;
wherein the drive assembly comprises a steerable jet pipe moveable by an amount determined by the control signal to cause corresponding movement of the valve spool;
the jet pipe terminating at one end in a nozzle and at the other end being in fluid flow engagement with and fixedly connected to a fluid supply torsion tube arranged to receive fluid from a fluid source, whereby movement of the valve spool is caused by fluid flowing from the nozzle to engage with the valve spool, and wherein the end of the torsion tube furthest from the jet pipe is fixedly attached to a slider component having a port in fluid flow engagement with the fluid source; the slider component mounted for sliding movement responsive to movement of the jet pipe responsive to the control signal, and the slider component providing a fluid flow channel between the port and the torsion tube and hence to the jet pipe.

2. The servovalve of claim 1, wherein the slider component is mounted within a housing of the fluid transfer assembly.

3. The servovalve of claim 1, wherein the end of the torsion tube is attached to the slider component by welding.

4. The servovalve of claim 1, wherein the fluid transfer valve assembly further comprises a return port for pressure returning through the assembly.

5. The servovalve of claim 1, wherein the fluid is directed into the spool from the nozzle via a receiver configured such that when the nozzle is in a central position, fluid enters the valve assembly evenly via both sides of the receiver when the nozzle is steered to an off-centre position, more fluid flows to one side of the valve assembly than the other via the receiver.

6. The servovalve of claim 1, wherein the receiver comprises lateral receiver channels to provide flow to each side of the valve assembly.

7. The servovalve of claim 1, wherein the nozzle is provided on the jet pipe mounted within a flexible tube, wherein the tube imparts movement to the jet pipe to steer the nozzle in response to the control signal.

8. The servovalve of claim 1, wherein the slider component comprises a ring provided with annular seals to allow for reciprocating side to side movement.

9. The servovalve of claim 8, wherein the ring is fixed to the torsion tube in a first orientation or plane, and the port in the ring opens in a different orientation or plane.

10. The servovalve of claim 1, wherein the slider component comprises two annular seals mounted in annular seal seats, the port and the annular seals being defined at a common axis.

\* \* \* \* \*